(12) United States Patent
Trinci et al.

(10) Patent No.: US 12,518,522 B2
(45) Date of Patent: Jan. 6, 2026

(54) SYSTEMS AND METHODS FOR REDUCING POWER CONSUMPTION OF EXECUTING LEARNING MODELS IN VEHICLE SYSTEMS

(71) Applicant: Verizon Patent and Licensing Inc., Basking Ridge, NJ (US)

(72) Inventors: Tomaso Trinci, Florence (IT);
Tommaso Bianconcini, Florence (IT);
Leonardo Taccari, Florence (IT);
Leonardo Sarti, Florence (IT);
Francesco Sambo, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 393 days.

(21) Appl. No.: 18/334,840

(22) Filed: Jun. 14, 2023

(65) Prior Publication Data

US 2024/0420460 A1 Dec. 19, 2024

(51) Int. Cl.
*G06V 10/82* (2022.01)
*G06V 20/40* (2022.01)

(52) U.S. Cl.
CPC ............. *G06V 10/82* (2022.01); *G06V 20/41* (2022.01); *G06V 20/49* (2022.01)

(58) Field of Classification Search
CPC ......... G06V 10/82; G06V 20/49; G06V 20/41
See application file for complete search history.

(56) References Cited

U.S. PATENT DOCUMENTS

| | | | |
|---|---|---|---|
| 10,327,046 B1 * | 6/2019 | Ni | H04N 21/8549 |
| 10,922,548 B1 * | 2/2021 | Huang | G06V 10/56 |
| 12,361,971 B2 * | 7/2025 | Su | G06V 10/82 |
| 2023/0154157 A1 * | 5/2023 | Ehteshami Bejnordi | G06V 10/464 382/156 |
| 2023/0185579 A1 * | 6/2023 | Eranpurwala | G06N 20/10 713/2 |
| 2024/0312252 A1 * | 9/2024 | Qiu | G06V 40/20 |
| 2025/0078220 A1 * | 3/2025 | Ravindran | G06V 10/82 |

OTHER PUBLICATIONS

Beyer et al., "FlexiViT: One Model for All Patch Sizes," arXiv:2212.08013v2, Mar. 23, 2023, 29 Pages.

(Continued)

*Primary Examiner* — Utpal D Shah

(57) ABSTRACT

A device may receive video data that includes a plurality of video frames, and may utilize a scheduling policy to divide the plurality of video frames into a first set of video frames and a second set of video frames. The device may process the first set of video frames, with a first convolutional neural network (CNN) model that includes one or more saliency gates, to generate first predictions and saliency maps, and may generate a trained first CNN model based on the first predictions and the saliency maps. The device may process the second set of video frames and the saliency maps, with a second CNN model that includes a saliency propagation module, to generate second predictions, and may generate a trained second CNN model based on the second predictions. The device may perform actions based on the trained first CNN model and the trained second CNN model.

20 Claims, 10 Drawing Sheets

Video system 105

140
Perform one or more actions based on the trained first CNN model and the trained second CNN model Modify the scheduling policy based on the trained first CNN model and the trained second CNN model Modify a quantity of the one or more saliency gates based on the trained first CNN model and the trained second CNN model Process real time video data with the trained first CNN model and the trained second CNN model Process real time temporal-based data with the trained first CNN model and the trained second CNN model Implement the trained first CNN model and the trained second CNN model at a traffic location or in a vehicle

(56) References Cited

OTHER PUBLICATIONS

Blalock et al., "What is the State of Neural Network Pruning?" arXiv:2003.03033v1, Mar. 6, 2020, 18 Pages.
Chen et al., "Eyeriss: An Energy-Efficient Reconfigurable Accelerator for Deep Convolutional Neural Networks," IEEE Journal of Solid-State Circuits, vol. 52, No. 1, 2016, 12 Pages.
Dosovitskly et al., "An Image is Worth 16X16 Words: Transformers for Image Recognition at Scale," Published as a conference paper at ICLR, Jun. 3, 2021, 22 Pages.
Fregin et al., "The DriveU Traffic Light Dataset: Introduction and Comparison with Existing Datasets," 2018 IEEE International Conference on Robotics and Automation (ICRA), May 21-25, 2018, Brisbane, Australia, 8 Pages.
Gou et al., "Knowledge Distillation: A Survey," International Journal of Computer Vision, vol. 129, No. 6, Jun. 2021, 36 Pages.
Han et al., "Dynamic Neural Networks: A Survey," IEEE Transactions on Pattern Analysis and Machine Intelligence, vol. 44, No. 11, Dec. 2, 2021, 20 Pages.
Hinton et al., "Distilling the Knowledge in a Neural Network," arXiv:1503.02531v1, Mar. 9, 2015, 9 Pages.
Howard et al., "arching for MobileNetV3," arXiv:1905.02244v5, Nov. 20, 2019, 11 Pages.
Jain et al., "Accel: A Corrective Fusion Network for Efficient Semantic Segmentation on Video," arXiv:1807.06667v4, Jul. 5, 2019, 10 Pages.
Jetley et al., "Learn to Pay Attention," Published as a conference paper at ICLR, Apr. 26, 2018, 14 Pages.
Li et al., "Towards Streaming Perception," arXiv:2005.10420v2, Aug. 25, 2020, 39 Pages.
Liang et al., "ANT: Adapt Network Across Time for Efficient Video Processing," Computer Vision Foundation, IEEE Xplore, 2022, 6 Pages.
Molchanov et al., "Importance Estimation for Neural Network Pruning," arXiv:1906.10771v1, Jun. 25, 2019, 11 Pages.
Nilsson et al., "Semantic Video Segmentation by Gated Recurrent Flow Propagation," arXiv: 1612.08871v2, Oct. 2, 2017, 11 Pages.
Ren et al., "SBNet: Sparse Blocks Network for Fast Inference," Computer Vision Foundation, IEEE Xplore, 2018, 10 Pages.
Sabet et al., "Temporal Early Exits for Efficient Video Object Detection," arXiv:2106.11208v1, Jun. 21, 2021, 11 Pages.
Scardapane et al., "Why should we add early exits to neural networks?" Cognitive Computation, arXiv:2004.12814v2, Jun. 23, 2020, 23 Pages.
Schlemper et al., "Attention gated networks: Learning to leverage salient regions in medical images," Medical Image Analysis, vol. 53, 2019, 11 Pages.
Shkolnik et al., "Robust Quantization: One Model to Rule Them All," 34th Conference on Neural Information Processing Systems (NeurIPS 2020), Vancouver, Canada, 10 Pages.
Tung et al., "Similarity-Preserving Knowledge Distillation," arXiv:1907.09682v2, Aug. 1, 2019, 10 Pages.
Verelst et al., "Dynamic Convolutions: Exploiting Spatial Sparsity for Faster Inference," Computer Vision Foundation, IEEE Xplore, 2020, 10 Pages.
Wang et al., "HAQ: Hardware-Aware Automated Quantization with Mixed Precision," arXiv:1811.08886v3, Apr. 6, 2019, 10 Pages.
Wang et al., "Not All Images are Worth 16x16Words: Dynamic Transformers for Efficient Image Recognition," 35th Conference on Neural Information Processing Systems (NeurIPS 2021), Sydney, Australia, 16 Pages.
Yang et al., "Resolution Adaptive Networks for Efficient Inference," Computer Vision Foundation, IEEE Xplore, 2020, 10 Pages.
Yu et al., "BDD100K: A Diverse Driving Dataset for Heterogeneous Multitask Learning," Computer Vision Foundation, IEEE Xplore, 2020, 10 Pages.

\* cited by examiner

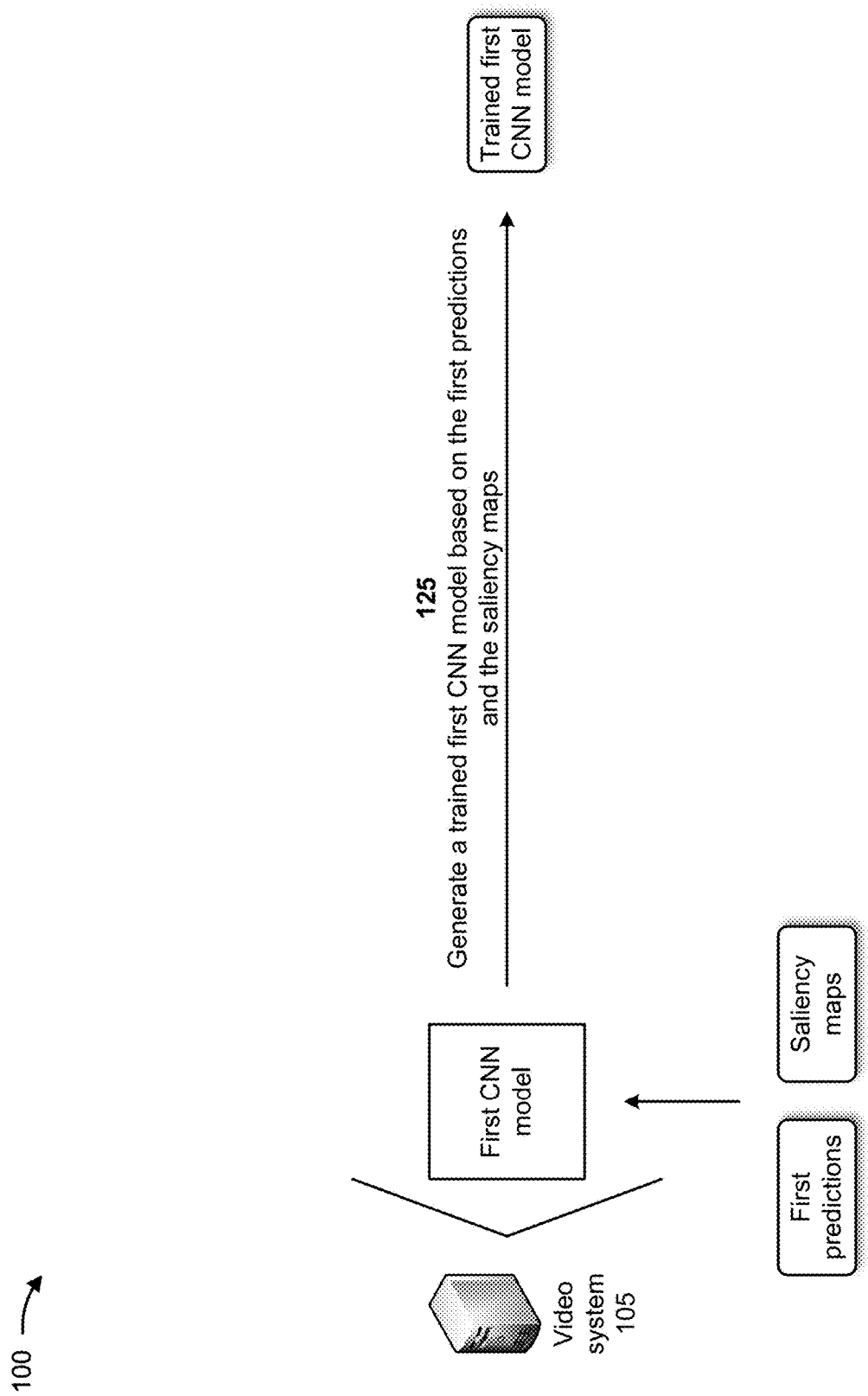

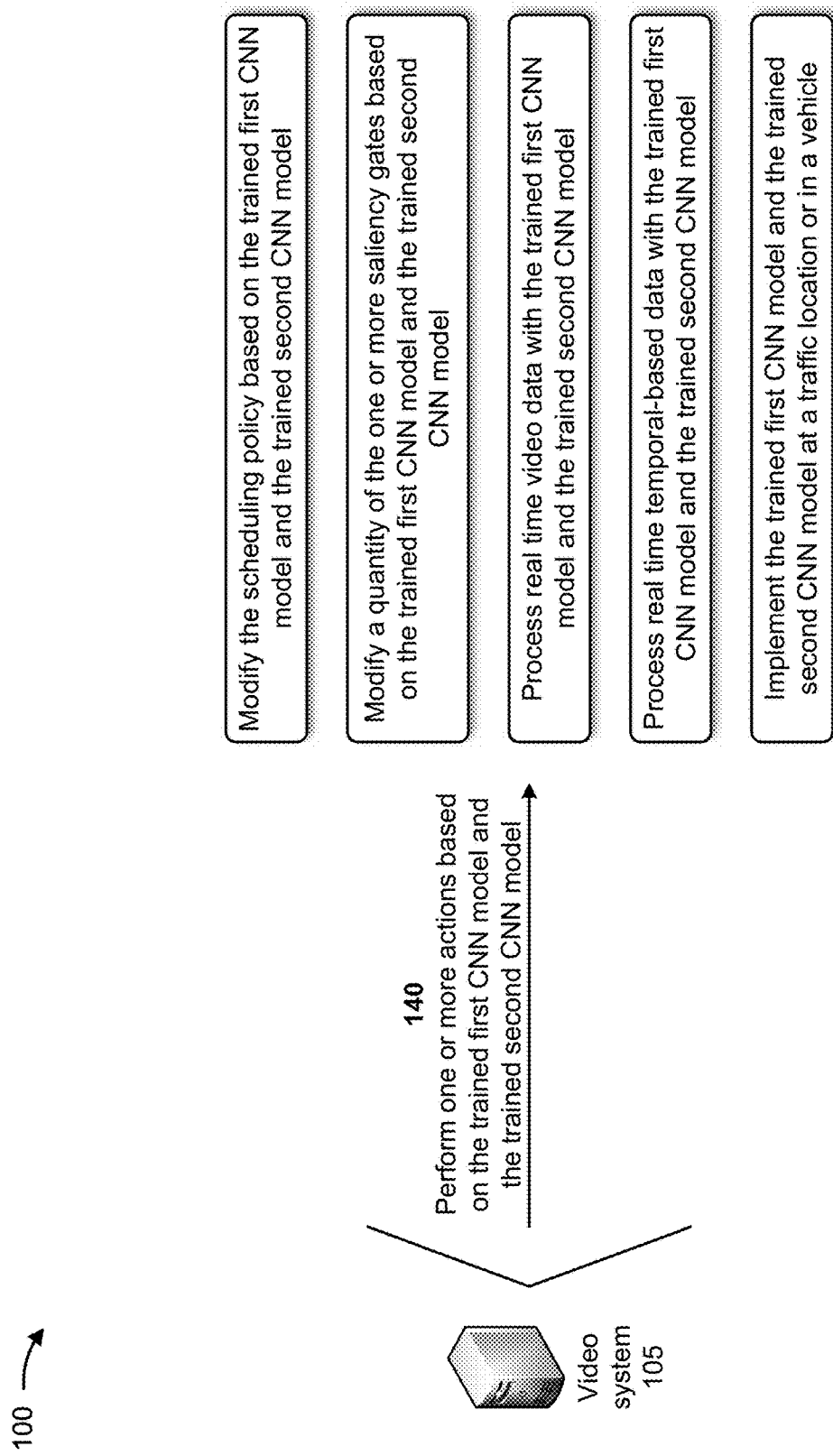

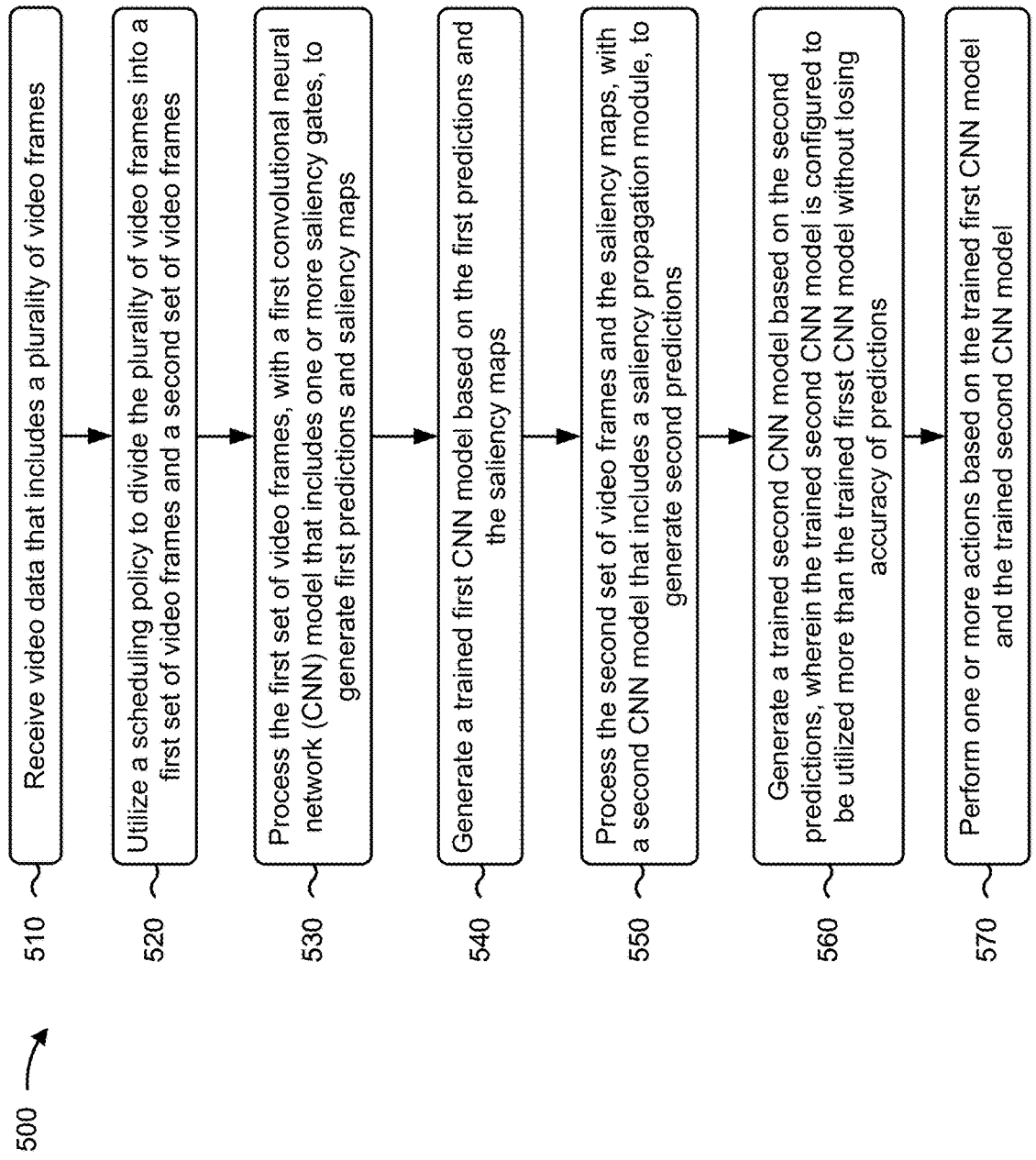

SYSTEMS AND METHODS FOR REDUCING POWER CONSUMPTION OF EXECUTING LEARNING MODELS IN VEHICLE SYSTEMS

BACKGROUND

A video system may utilize machine learning models to classify video data, such as video data identifying driving events (e.g., tailgating, a collision, distraction, drowsiness, and/or the like) triggered by accelerometers, front facing cameras, driver facing cameras, and/or the like. For example, a camera or an accelerometer may identify a driving event of interest (e.g., a high acceleration value, a short following distance to another vehicle, and/or the like), and video data from the camera may be provided to the video system for further analysis.

BRIEF DESCRIPTION OF THE DRAWINGS

FIGS. 1A-1F are diagrams of an example associated with reducing power consumption of executing learning models in vehicle systems.

FIG. 5 is a flowchart of an example process for reducing power consumption of executing learning models in vehicle systems.

DETAILED DESCRIPTION OF EXAMPLE EMBODIMENTS

Figure 1A:
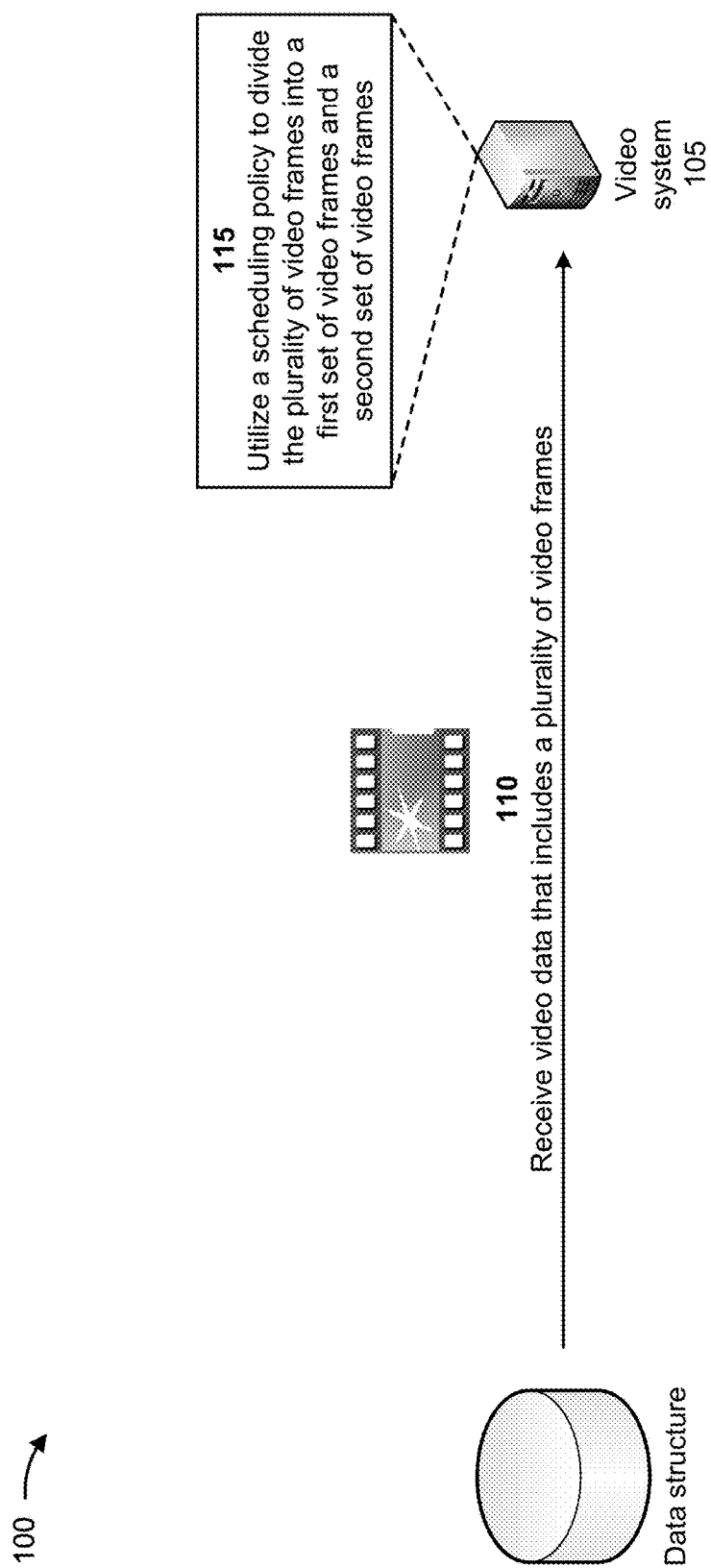

The following detailed description of example implementations refers to the accompanying drawings. The same reference numbers in different drawings may identify the same or similar elements.

Deep learning models typically consume significant amounts of energy. is becoming essential due to the increasing pervasiveness of connected and mobile devices that utilize such models. Real time video classification is an example of an energy-intensive task that could cause significant battery consumption and overheating issues on mobile devices as compared to more common tasks on mobile devices. Inference phases of deep learning models in resource-constrained devices represents a major challenge in many applications. Current techniques focus on different approaches to achieve a good tradeoff between energy consumption and model quality. Real time video processing on mobile devices is an example of an application that benefits from deep learning techniques, as real-time video processing involves processing a continuous stream of video frames with a computational cost that grows linearly with a frame rate of the video. Thus, current techniques for utilizing deep learning models consume computing resources (e.g., processing resources, memory resources, communication resources, and/or the like), networking resources, and/or other resources associated with failing to classify real time video data due to limited resources for a deep learning model, improperly classifying real time video data due to limited resources for the deep learning model, causing a device utilizing the deep learning model to overheat or consume excessive battery power, and/or the like.

Some implementations described herein relate to a video system that reduces power consumption of executing learning models in vehicle systems. For example, the video system may receive video data that includes a plurality of video frames, and may utilize a scheduling policy to divide the plurality of video frames into a first set of video frames and a second set of video frames. The video system may process the first set of video frames, with a first convolutional neural network (CNN) model that includes, in some implementations, one or more saliency gates, to generate first predictions (e.g., if a task is classification of cats versus dogs, the prediction may be cat or dog) and saliency maps (e.g., a map that includes regions of interest where a neural network is focusing to make a prediction, may be attached to network layers at different depths, and each saliency map may be a saliency map of a layer at a specific depth), and may generate a trained first CNN model based on the first predictions and the saliency maps. The video system may process the second set of video frames and the saliency maps, with a second CNN model that includes a saliency propagation module, to generate second predictions, and may generate a trained second CNN model based on the second predictions. The video system may perform actions based on the trained first CNN model and the trained second CNN model, such as implementing the trained first CNN and the trained second CNN model in a resource-limited device (e.g., to conserve energy consumption).

In this way, the video system reduces power consumption of executing learning models in vehicle systems. For example, the video system may include two convolutional neural network (CNN) models with different parameter sizes and input resolutions. The video system may process each video frame of video data with only one of the CNN models, and may utilize saliency maps (e.g., generated by the CNN model with a greater input resolution and parameter size on a previous video frame) with the CNN model with a lower input resolution and parameter size (e.g., that consumes less battery power). The video system may be utilized with, for example, a task that involves recognizing states of traffic lights in images from on-board cameras of vehicles. Thus, the video system may conserve computing resources, networking resources, and/or other resources that would have otherwise been consumed by failing to classify real time video data due to limited resources for a deep learning model, improperly classifying real time video data due to limited resources for the deep learning model, causing a device utilizing the deep learning model to overheat or consume excess battery power, and/or the like.

FIGS. 1A-1F are diagrams of an example 100 associated with reducing power consumption of executing learning models in vehicle systems. As shown in FIGS. 1A-1F, example 100 includes a video system 105 associated with a data structure. The video system 105 may include a system that reduces power consumption of executing learning models in vehicle systems. The data structure may include a database, a table, a list, and/or the like. Further details of the video system 105 and the data structure are provided elsewhere herein.

As shown in FIG. 1A, and by reference number 110, the video system 105 may receive video data that includes a plurality of video frames. For example, dashcams or other video devices of vehicles may record video data (e.g., video footage) of events associated with the vehicles. The video data may be recorded based on a trigger associated with the events. For example, a harsh event may be detected by an accelerometer mounted inside a vehicle (e.g., a kinematics trigger). Alternatively, a processing device of a vehicle may include a machine learning model that detects a potential danger for the vehicle and requests further processing to obtain the video data. Alternatively, a driver of a vehicle may cause the video data to be captured at a moment at which the event occurs. The vehicles or the video devices may transfer the video data to a data structure (e.g., a database, a table, a list, and/or the like). This process may be repeated over time so that the data structure includes video data identifying videos associated with driving events (e.g., for the vehicles and/or the drivers of the vehicles).

In some implementations, the video system 105 may continuously receive the video data that includes the plurality of video frames from the data structure, may periodically receive the video data that includes the plurality of video frames from the data structure, or may receive the video data that includes the plurality of video frames from the data structure based on requesting the video data from the data structure.

As further shown in FIG. 1A, and by reference number 115, the video system 105 may utilize a scheduling policy to divide the plurality of video frames into a first set of video frames and a second set of video frames. For example, the video system 105 may include a first CNN model ($\Phi$) and a second CNN model ($\Phi'$) that include a similar architecture and a similar depth. However, a parameter size (or width) of the first CNN model may be greater than a parameter size (or width) of the second CNN model, and an input resolution of the first CNN model is greater than an input resolution of the second CNN model. Each of the plurality of video frames may be processed by only one of the first CNN model and the second CNN model based on the scheduling policy. To provide an energy efficient architecture, the video system 105 may utilize the first CNN model for a first quantity T of the plurality of video frames that corresponds to the first set of video frames. The first CNN model may generate high quality predictions and saliency maps based on processing the first set of video frames. The video system 105 may utilize the output of the first CNN model and a second quantity T−1 of the plurality of video frames processed (e.g., that corresponds to the second set of video frames) with the second CNN model (e.g., which is more efficient).

In some implementations, when utilizing the scheduling policy to divide the plurality of video frames into the first set of video frames and the second set of video frames, the video system 105 may select a first quantity of the plurality of video frames as the first set of video frames, and may select a second quantity of the plurality of video frames as the second set of video frames. In such implementations, the second quantity is greater than the first quantity. Different scheduling policies may lead to different tradeoffs between accuracy and efficiency of the video system 105. For example, larger values of the first quantity T may increase an efficiency of the video system 105 but may result in a decrease of prediction quality generated by the video system 105.

Figure 1B:
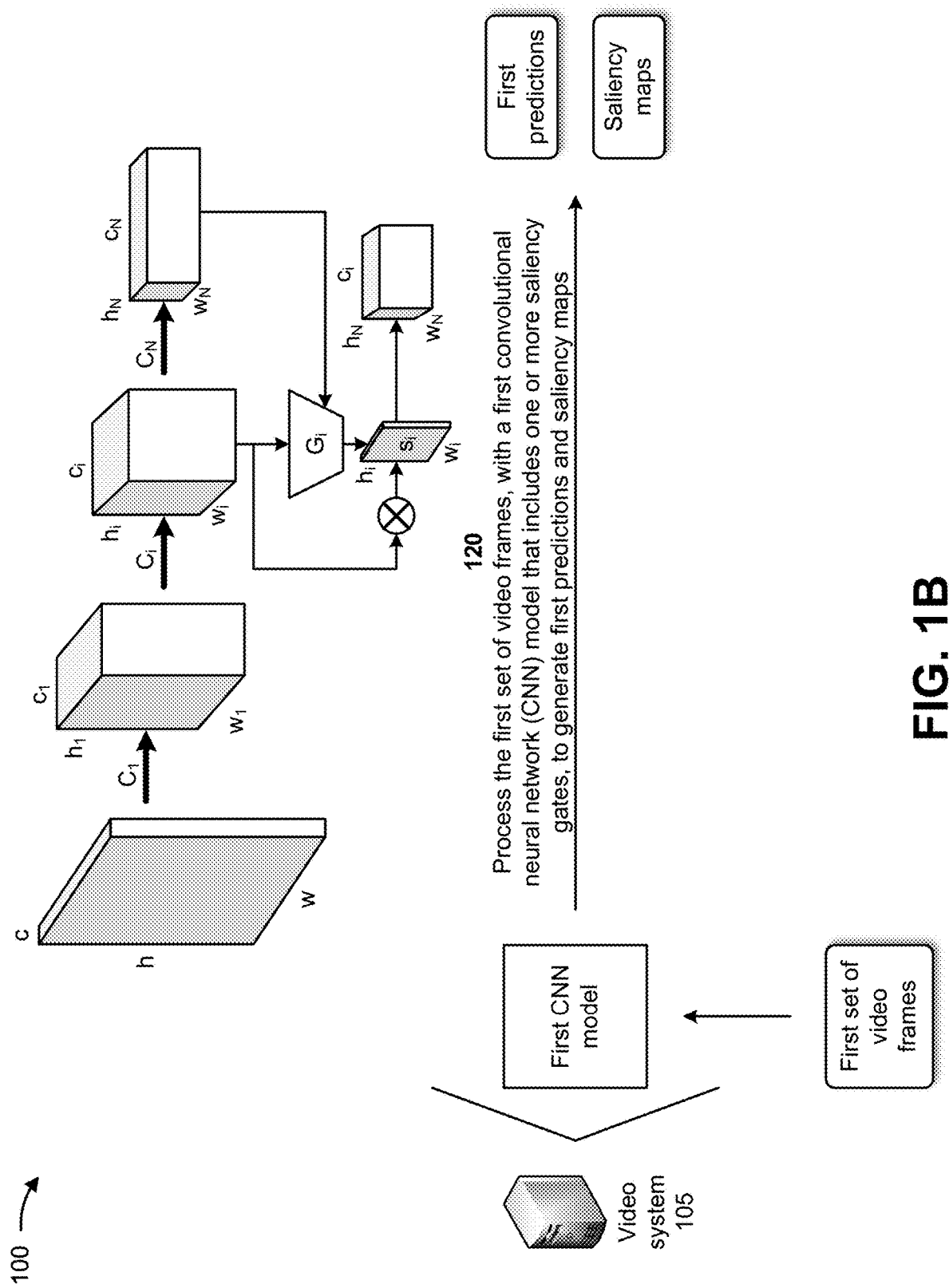

As shown in FIG. 1B, and by reference number 120, the video system 105 may process the first set of video frames, with a first CNN model that includes one or more saliency gates, to generate first predictions and saliency maps. For example, the first CNN model ($\Phi$) may include a sequence of convolutional layers $C_i$, where $\Phi=[C_1, \ldots, C_N]$. An output of each convolutional layer $C_i$ may include a feature map $f_i \in \mathbb{R}^{c_i \times h_i \times w_i}$, where the first CNN model ($\Phi$) has a larger resolution and is wider than the second CNN model ($\Phi'$) (e.g., $c_i \geq c'_i$, $h_i \geq h'_i$, and $w_i \geq w'_i$, for all $i=1, \ldots, N$). The first CNN model may include one or more saliency gates (G) that compute saliency maps based on hidden representations. The saliency gates may identify salient image regions in the first set of video frames. The saliency gates may share spatial priors from the first CNN model ($\Phi$) with the second CNN model ($\Phi'$). In some implementations, the saliency gates may be provided after any of the convolutional layers of the first CNN model ($\Phi$). For example, for a hidden representation $f_i \in \mathbb{R}^{c_i \times h_i \times w_i}$, calculated by a convolutional layer $C_i$, the first CNN model may calculate a saliency map at this layer. The saliency gate $G_i$ may receive the hidden representation $f_i$ and a last latent representation $f_N$ calculated by the first CNN model, and may calculate a saliency map $s_i \in \mathbb{R}^{h_i \times w_i}$ by applying a small convolutional encoder and based on the hidden representation and the last latent representation.

In some implementations, the video system 105 may process the first set of video frames, with a first CNN model, to generate the first predictions, and may process the first set of video frames, with the one or more saliency gates, to generate the saliency maps. The first predictions may include, for example, classifications for the first set of video frames. In some implementations, the first predictions may include severity scores of driving events (e.g., distinguishing between a critical event, a major event, a moderate event, and a minor event) and a set of additional attributes associated with the events (e.g., a presence or an absence of tailgating, a stop sign violation, a rolling stop at a traffic sign, and/or the like).

As shown in FIG. 1C, and by reference number 125, the video system 105 may generate a trained first CNN model based on the first predictions and the saliency maps. For example, the video system 105 may periodically or continuously train the first CNN model and the one or more saliency gates, with the first predictions and the saliency maps, to generate the trained first CNN model. The video system 105 may utilize the first predictions and the saliency maps to generate a new and improved first CNN model that predicts improved video classifications and new and improved saliency gates that more accurately generate saliency maps based on hidden representations. In this way, the video system 105 provides a fully automatic and continuous training pipeline for the first CNN model and the one or more saliency gates. In some implementations, in order to train the one or more saliency gates and the first CNN model, the saliency maps may be applied on the feature map $f_i$ to obtain a representation that is resized and concatenated with $f_N$ so that it can be used as input for a classification layer that outputs a standard cross entropy loss.

In some implementations, the video system 105 may separately train the first CNN model and the second CNN model. In one example, the video system 105 may train the first CNN model and the saliency gates for a quantity (e.g., forty) of epochs with a batch size (e.g., a size of sixteen) and a stochastic optimization method (e.g., AdamW) with a 0.001 initial learning rate decreased to 0.0001 after thirty epochs. The video system 105 may train the second CNN model for a quantity (e.g., twenty) of epochs with a batch size (e.g., a size of sixteen) and a stochastic optimization method (e.g., AdamW) with a 0.001 initial learning rate. The video system 105 may train the combination of the first CNN model and the second CNN model where the parameters of the first CNN model are frozen while the second CNN mode is fine-tuned, along with the parameters of the salient propagation modules, for fifteen epochs with a smaller learning rate of 0.0001. During the combined training, the video system 105 may utilize video frames with a random temporal delay k∈{1, 2, 3} between the first CNN model and the second CNN model (e.g., to simulate live video data).

Figure 1D:
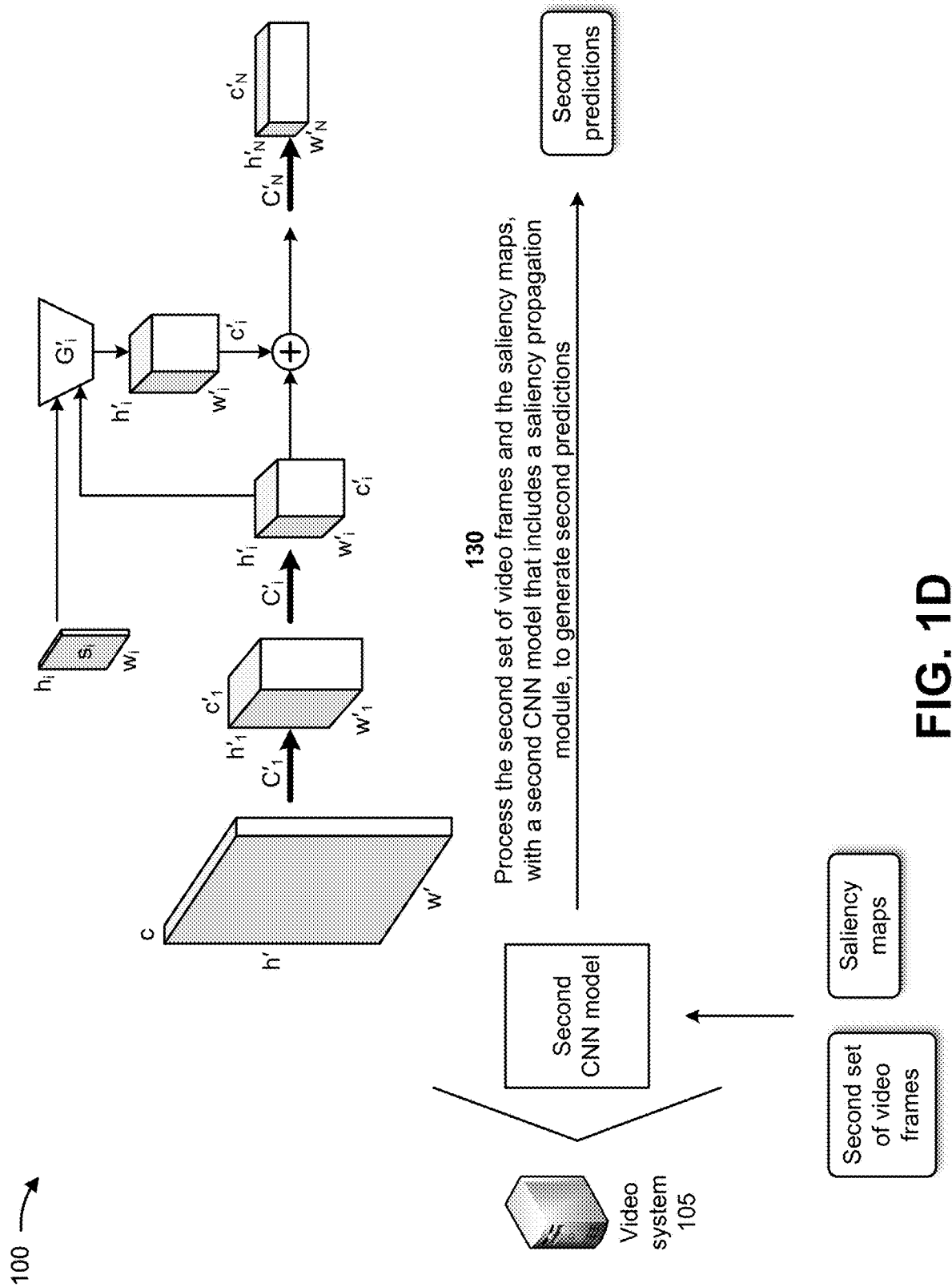

As shown in FIG. 1D, and by reference number 130, the video system 105 may process the second set of video frames and the saliency maps, with a second CNN model that includes a saliency propagation module, to generate second predictions. For example, the second CNN model (Φ') may include a sequence of convolutional layers $C'_i$, where $\Phi'=[C'_1, \ldots, C'_N]$. An output of each convolutional layer $C'_i$ may include a feature map $f'_i \in \mathbb{R}^{c'_i \times h'_i \times w'_i}$, where the first CNN model (Φ) has a larger resolution and is wider than the second CNN model (Φ') (e.g., $c_i \geq c'_i$, $h_i \geq h'_i$, and $w_i \geq w'_i$, for all i=1, ..., N). The second CNN model may include one or more saliency propagation modules ($G'_i$) that inject, into the second CNN model and at time t+k, spatial priors included in the saliency maps extracted at time t, while also correcting potential spatial misalignment due to an elapsed time. In some implementations, the saliency propagation modules may be in a one-to-one correspondence with the saliency gates of the first CNN model. For example, for a hidden representation $f'_i$ calculated by $C'_i$ and a saliency map $s_i$ calculated by the saliency gate $G_i$ from a last video frame processed by the first CNN model, the saliency propagation module ($G'_i$) may decrease an intensity of the saliency map with an exponential decay $$\hat{s}_i = s_i \cdot e^{\frac{k}{\tau}},$$

for a decay ratio τ, where k is a temporal distance between a video frame processed by the first CNN model and a current video frame. The saliency map $\hat{s}_i$ may be applied element-wise to $f'_i$. The result goes through convolutional layers, obtaining a tensor that has the same shape as $f'_i$. Therefore, the two representations may be summed and used as input for a following convolutional layer $C'_{i+1}$ in the second CNN model.

In some implementations, the video system 105 may process the second set of video frames, with the second CNN model and while utilizing the saliency propagation module (e.g., to inject the saliency maps), to generate the second predictions. The second predictions may include, for example, classifications for the second set video frames. In some implementations, the second predictions may include severity scores of driving events (e.g., distinguishing between a critical event, a major event, a moderate event, and a minor event) and a set of additional attributes associated with the events (e.g., a presence or an absence of tailgating, a stop sign violation, a rolling stop at a traffic sign, and/or the like).

Figure 1E:
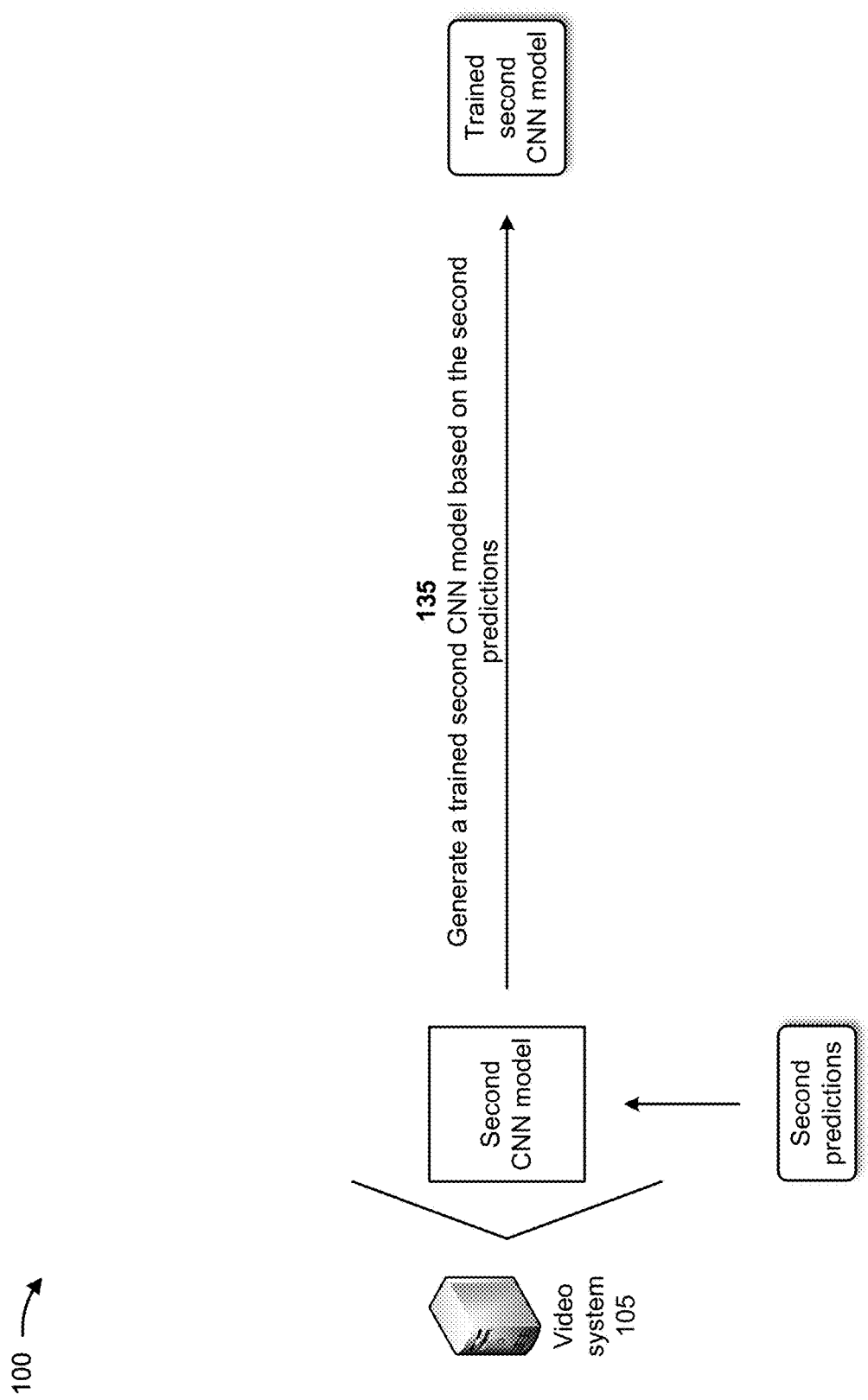

As shown in FIG. 1E, and by reference number 135, the video system 105 may generate a trained second CNN model based on the second predictions. For example, the video system 105 may periodically or continuously train the second CNN model and the saliency propagation module, with the second predictions, to generate the trained second CNN model. The video system 105 may utilize the second predictions to generate a new and improved second CNN model that predicts improved video classifications and a new and improved saliency propagation module that more accurately injects the saliency maps into the second CNN model. In this way, the video system 105 provides a fully automatic and continuous training pipeline for the second CNN model and the saliency propagation module. In some implementations, the video system 105 may receive the trained first CNN model and/or the trained second CNN model, and may utilize the trained first CNN model and/or the trained second CNN model. Alternatively, the video system 105 may generate the trained first CNN model and/or the trained second CNN model, and may provide the trained first CNN model and/or the trained second CNN model to one or more other devices.

As shown in FIG. 1F, and by reference number 140, the video system 105 may perform one or more actions based on the trained first CNN model and the trained second CNN model. In some implementations, performing the one or more actions includes the video system 105 modifying the scheduling policy based on the trained first CNN model and the trained second CNN model. For example, the video system 105 may modify the scheduling policy to increase or decrease the quantity of the plurality of video frames included in the first set of video frames and/or the increase or decrease the quantity of the plurality of video frames included in the second set of video frames. Such modifications may affect the accuracy of the second CNN model and the energy consumed by the second CNN model. In this way, the video system 105 may conserve computing resources, networking resources, and/or other resources that would have otherwise been consumed by failing to classify real time video data due to limited resources for a deep learning model.

In some implementations, performing the one or more actions includes the video system 105 modifying a quantity of the one or more saliency gates based on the trained first CNN model and the trained second CNN model. For example, the video system 105 may determine to generate more saliency maps, and may increase the quantity of the saliency gates utilized by the first CNN model based on the determination. Alternatively, the video system 105 may determine to generate fewer saliency maps, and may decrease the quantity of the saliency gates utilized by the first CNN model based on the determination. In this way, the video system 105 may conserve computing resources, networking resources, and/or other resources that would have otherwise been consumed by improperly classifying real time video data due to limited resources for a deep learning model.

In some implementations, performing the one or more actions includes the video system 105 processing real time video data with the trained first CNN model and the trained second CNN model. For example, the video system 105 may receive real time video data (e.g., from a vehicle or multiple vehicles, from a traffic camera, and/or the like), and may divide the real time video data into a first set of real time video data and a second set of real time video data based on the scheduling policy. The video system 105 may process the first set of real time video data, with the trained first CNN model, to generate first predictions and the saliency maps, and may process the second set of real time video data and the saliency maps, with the trained second CNN model, to generate second predictions. The video system 105 may utilize the second predictions to perform additional actions (e.g., alert emergency services, alert a driver, and/or the like). In this way, the video system 105 may conserve computing resources, networking resources, and/or other resources that would have otherwise been consumed by failing to classify real time video data due to limited resources for a deep learning model.

In some implementations, performing the one or more actions includes the video system 105 processing real time temporal-based data with the trained first CNN model and the trained second CNN model. For example, the video system 105 may receive real time temporal-based data (e.g., weather data, network traffic, and/or the like), and may divide the real time temporal-based data into a first set of real time temporal-based data and a second set of real time temporal-based data based on the scheduling policy. The video system 105 may process the first set of real time temporal-based data, with the trained first CNN model, to generate first predictions and the saliency maps, and may process the second set of real time temporal-based data and the saliency maps, with the trained second CNN model, to generate second predictions. The video system 105 may utilize the second predictions to perform additional actions (e.g., alert emergency services, alert a homeowner, alert a network administrator, and/or the like). In this way, the video system 105 may conserve computing resources, networking resources, and/or other resources that would have otherwise been consumed by improperly classifying real time video data due to limited resources for a deep learning model.

In some implementations, performing the one or more actions includes the video system 105 implementing the trained first CNN model and the trained second CNN model at a traffic location or in a vehicle. For example, the video system 105 may provide the trained first CNN model and the trained second CNN model to a traffic camera (e.g., at the traffic location) or to the vehicle. The traffic camera or the vehicle may utilize the trained first CNN model and the trained second CNN model to process real time video data (e.g., as described above) received by the traffic camera or the vehicle. In this way, the video system 105 may conserve computing resources, networking resources, and/or other resources that would have otherwise been consumed by causing a device utilizing the deep learning model to overheat or consume battery power.

In this way, the video system 105 reduces power consumption of executing learning models in vehicle systems by providing cross-model temporal cooperation via saliency maps for efficient frame classification. For example, the video system 105 may include two CNN models with different parameter sizes and input resolutions. The video system 105 may process each video frame of video data with only one of the CNN models, and may utilize saliency maps (e.g., generated by the CNN model with a greater input resolution and parameter size on a previous video frame) with the CNN model with a lower input resolution and parameter size. The video system 105 may be utilized with, for example, a task that involves recognizing states of traffic lights in images from on-board cameras of vehicles. Thus, the video system 105 may conserve computing resources, networking resources, and/or other resources that would have otherwise been consumed by failing to classify real time video data due to limited resources for a deep learning model, improperly classifying real time video data due to limited resources for the deep learning model, causing a device utilizing the deep learning model to overheat or consume excess battery power, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
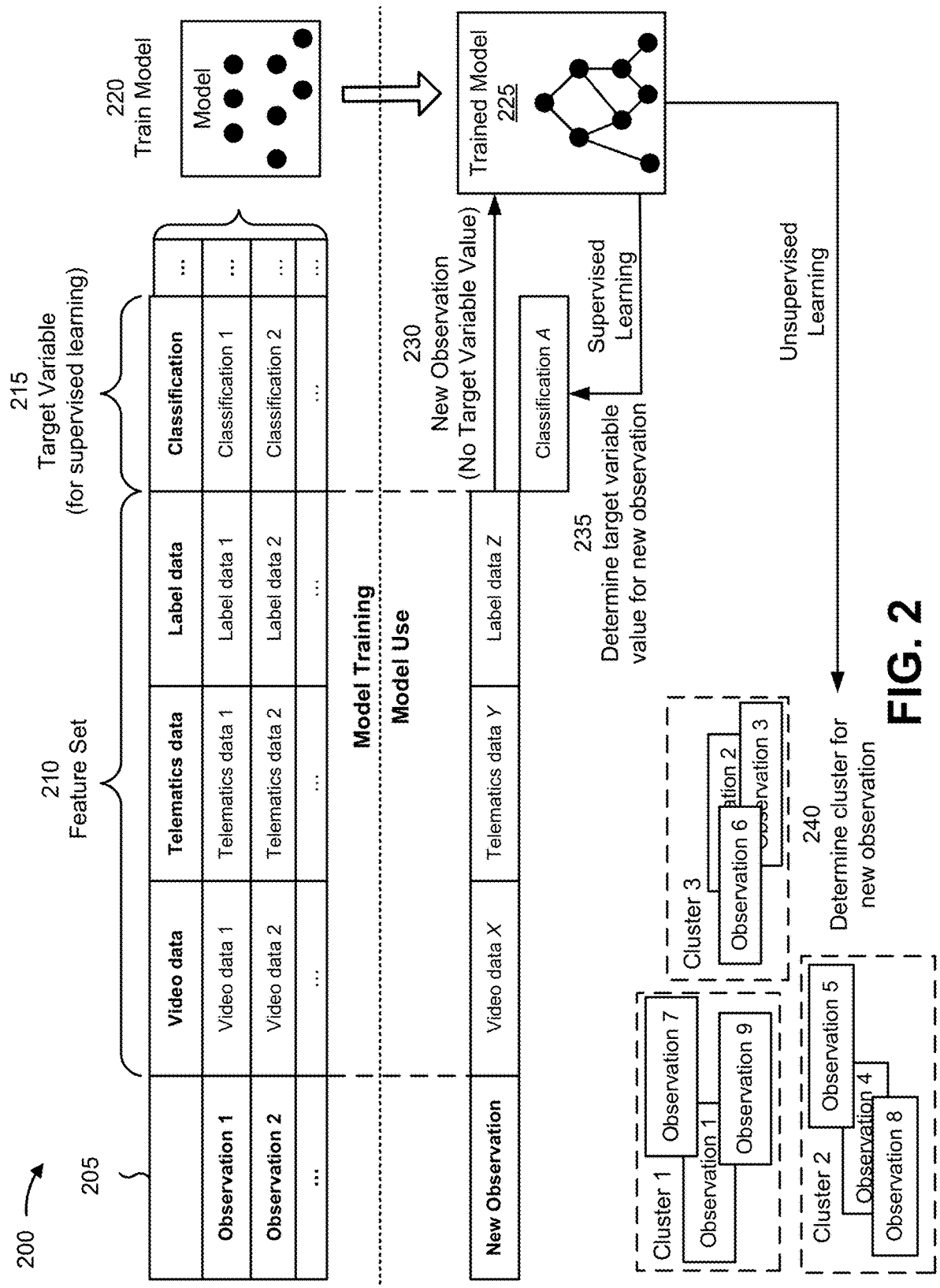
FIG. 2 is a diagram illustrating an example of training and using a machine learning model.

FIG. 2 is a diagram illustrating an example 200 of training and using a machine learning model. The machine learning model training and usage described herein may be performed using a machine learning system. The machine learning system may include or may be included in a computing device, a server, a cloud computing environment, or the like, such as the video system 105.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the video system 105, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the video system 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of video data, a second feature of telematics data, a third feature of label data, and so on. As shown, for a first observation, the first feature may have a value of video data 1, the second feature may have a value of telematics data 1, the third feature may have a value of label data 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a classification, which has a value of classification 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of video data X, a second feature of telematics data Y, a third feature of label data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of classification A for the target variable of classification for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a video data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a telematics data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to determine a classification of video. The machine learning system may enable recognition and/or identification of tens, hundreds, thousands, or millions of features and/or feature values for tens, hundreds, thousands, or millions of observations, thereby increasing accuracy and consistency and reducing delay associated with determining a classification of video relative to requiring computing resources to be allocated for tens, hundreds, or thousands of operators to manually determine a classification of video using the features or feature values.

As indicated above, FIG. 2 is provided as an example. Other examples may differ from what is described in connection with FIG. 2.

Figure 3:
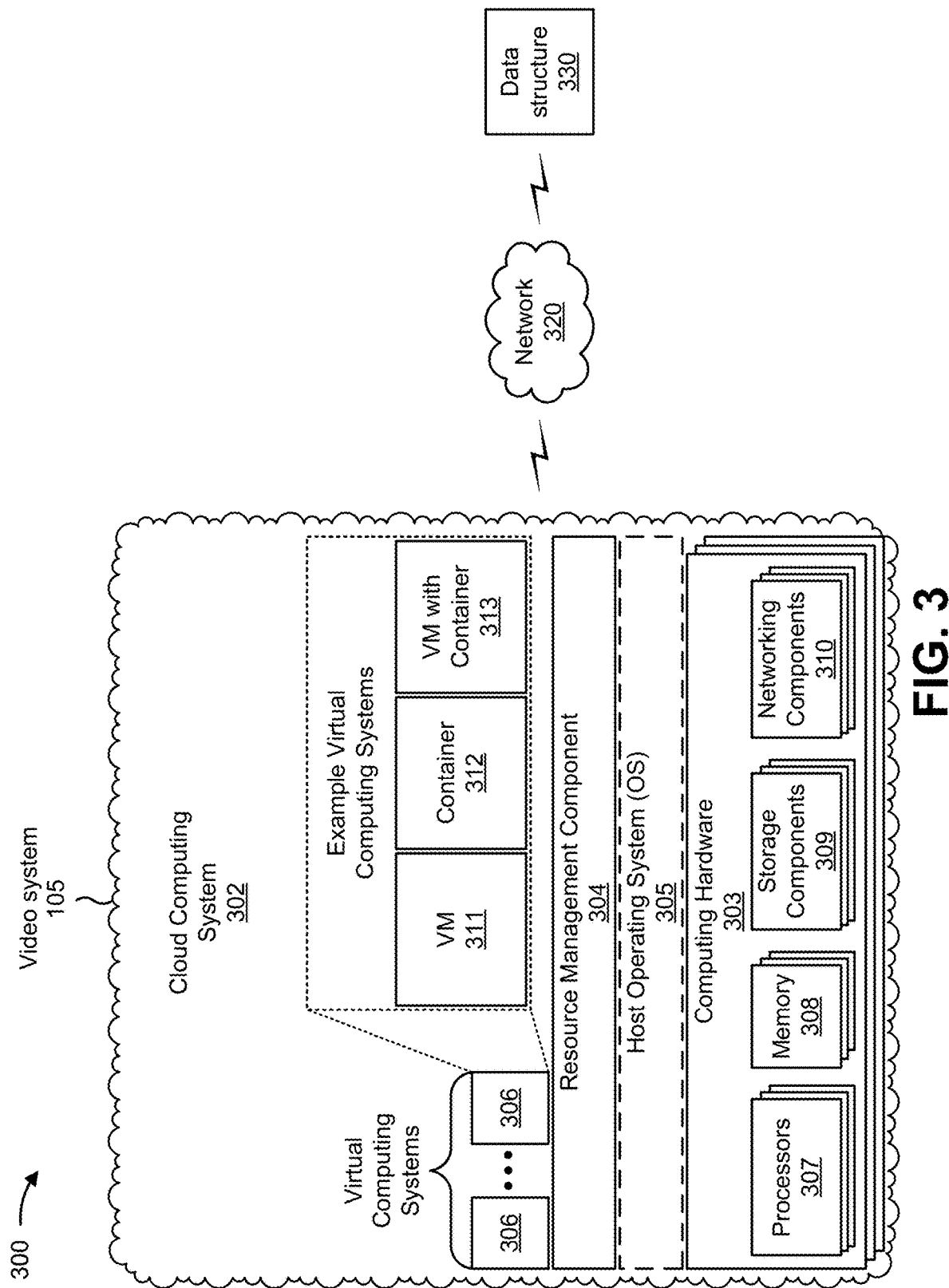
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the video system 105, which may include one or more elements of and/or may execute within a cloud computing system 302. The cloud computing system 302 may include one or more elements 303-313, as described in more detail below. As further shown in FIG. 3, the environment 300 may include a network 320 and/or a data structure 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the video system 105 may include one or more elements 303-313 of the cloud computing system 302, may execute within the cloud computing system 302, and/or may be hosted within the cloud computing system 302, in some implementations, the video system 105 may not be cloud-based (e.g., may be implemented outside of a cloud computing system) or may be partially cloud-based. For example, the video system 105 may include one or more devices that are not part of the cloud computing system 302, such as a device 400 of FIG. 4, which may include a standalone server or another type of computing device. The video system 105 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The data structure 330 may include one or more devices capable of receiving, generating, storing, processing, and/or providing information, as described elsewhere herein. The data structure 330 may include a communication device and/or a computing device. For example, the data structure 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
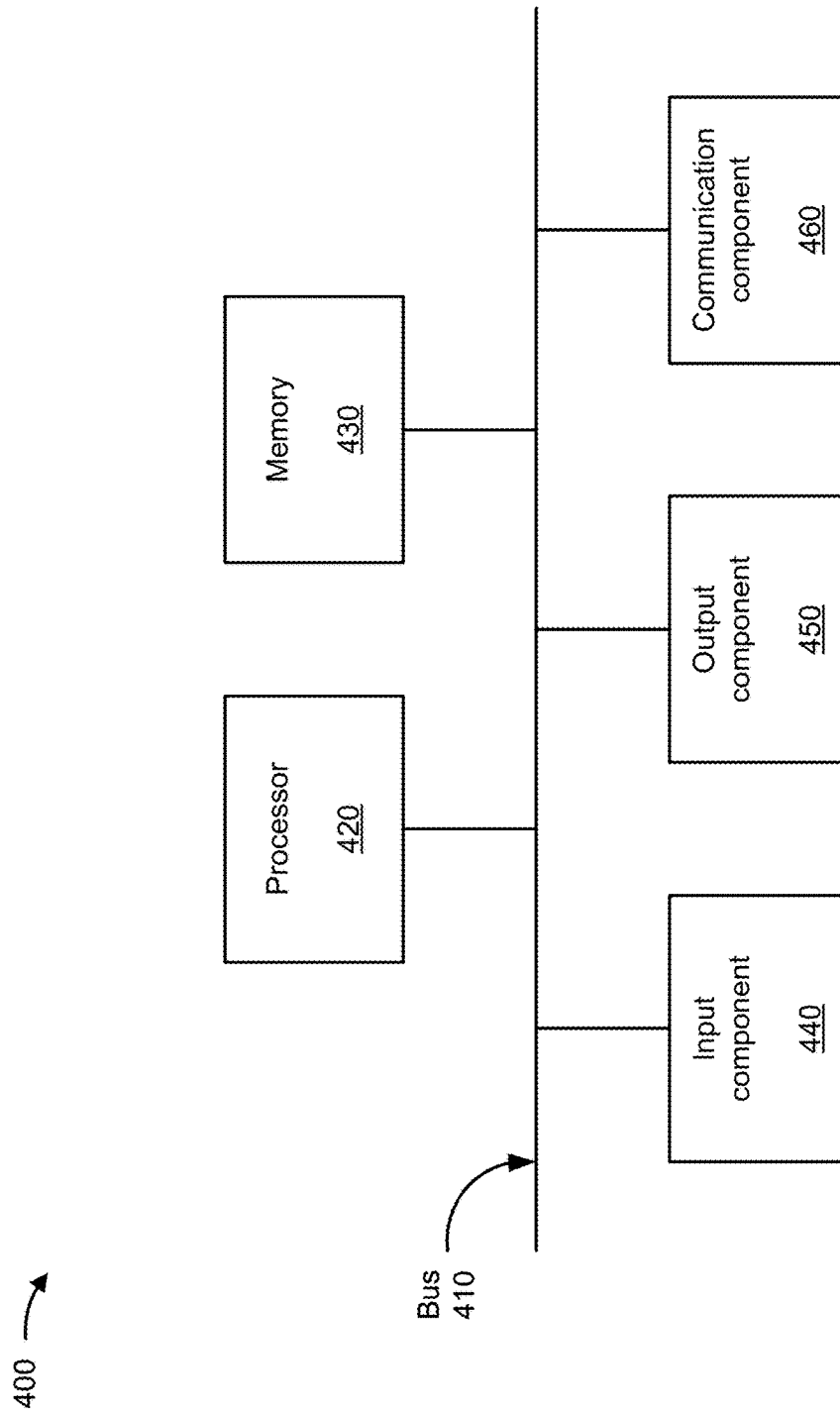
FIG. 4 is a diagram of example components of one or more devices of FIG. 3.

FIG. 4 is a diagram of example components of a device 400, which may correspond to the video system 105 and/or the data structure 330. In some implementations, the video system 105 and/or the data structure 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 depicts a flowchart of an example process 500 for reducing power consumption of executing learning models in vehicle systems. In some implementations, one or more process blocks of FIG. 5 may be performed by a device (e.g., the video system 105). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving video data that includes a plurality of video frames (block 510). For example, the device may receive video data that includes a plurality of video frames, as described above.

As further shown in FIG. 5, process 500 may include utilizing a scheduling policy to divide the plurality of video frames into a first set of video frames and a second set of video frames (block 520). For example, the device may utilize a scheduling policy to divide the plurality of video frames into a first set of video frames and a second set of video frames, as described above. In some implementations, utilizing the scheduling policy to divide the plurality of video frames into the first set of video frames and the second set of video frames includes selecting a first quantity of the plurality of video frames as the first set of video frames, and selecting a second quantity of the plurality of video frames as the second set of video frames, wherein the second quantity is greater than the first quantity.

As further shown in FIG. 5, process 500 may include processing the first set of video frames, with a first CNN model that includes one or more saliency gates, to generate first predictions and saliency maps (block 530). For example, the device may process the first set of video frames, with a first CNN model that includes one or more saliency gates, to generate first predictions and saliency maps, as described above. In some implementations, each of the saliency maps identifies salient image regions in a video frame of the first set of video frames. In some implementations, the one or more saliency gates calculate the saliency maps. In some implementations, each of the one or more saliency gates is provided after a convolutional block of the first CNN model. In some implementations, each of the one or more saliency gates calculates one of the saliency maps based on a hidden representation calculated by a convolutional block of the first CNN model and a last latent representation calculated by the first CNN model.

As further shown in FIG. 5, process 500 may include generating a trained first CNN model based on the first predictions and the saliency maps (block 540). For example, the device may generate a trained first CNN model based on the first predictions and the saliency maps, as described above.

As further shown in FIG. 5, process 500 may include processing the second set of video frames and the saliency maps, with a second CNN model that includes a saliency propagation module, to generate second predictions (block 550). For example, the device may process the second set of video frames and the saliency maps, with a second CNN model that includes a saliency propagation module, to generate second predictions, as described above. In some implementations, a first parameter size of the first CNN model is greater than a second parameter size of the second CNN model. In some implementations, a first input resolution of the first CNN model is greater than a second input resolution of the second CNN model. In some implementations, the saliency propagation module injects spatial priors of the saliency maps into the second CNN model and corrects spatial misalignment due to elapsed time.

As further shown in FIG. 5, process 500 may include generating a trained second CNN model based on the second predictions, wherein the trained second CNN model is configured to be utilized more than the trained first CNN model without losing accuracy of predictions (block 560). For example, the device may generate a trained second CNN model based on the second predictions, as described above. In some implementations, the trained second CNN model is configured to be utilized more than the trained first CNN model without losing accuracy of predictions.

As further shown in FIG. 5, process 500 may include performing one or more actions based on the trained first CNN model and the trained second CNN model (block 570). For example, the device may perform one or more actions based on the trained first CNN model and the trained second CNN model, as described above. In some implementations, performing the one or more actions includes modifying the first quantity of the plurality of video frames or the second quantity of the plurality of video frames based on the trained first CNN model and the trained second CNN model. In some implementations, performing the one or more actions includes modifying a quantity of the one or more saliency gates based on the trained first CNN model and the trained second CNN model.

In some implementations, performing the one or more actions includes one or more of processing real time video data with the trained first CNN model and the trained second CNN model to generate classifications for the real time video data, or processing real time temporal-based data with the trained first CNN model and the trained second CNN model. In some implementations, performing the one or more actions includes implementing the trained first CNN model and the trained second CNN model at a traffic location or in a vehicle.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, video data that includes a plurality of video frames;
   utilizing, by the device, a scheduling policy to divide the plurality of video frames into a first set of video frames and a second set of video frames;
   processing, by the device, the first set of video frames, with a first convolutional neural network (CNN) model that includes one or more saliency gates, to generate first predictions and saliency maps;
   generating, by the device, a trained first CNN model based on the first predictions and the saliency maps;
   processing, by the device, the second set of video frames and the saliency maps, with a second CNN model that includes a saliency propagation module, to generate second predictions;
   generating, by the device, a trained second CNN model based on the second predictions,
      wherein the trained second CNN model is configured to be utilized more than the trained first CNN model without losing accuracy of predictions; and
   performing, by the device, one or more actions based on the trained first CNN model and the trained second CNN model.

2. The method of claim 1, wherein utilizing the scheduling policy to divide the plurality of video frames into the first set of video frames and the second set of video frames comprises:
   selecting a first quantity of the plurality of video frames as the first set of video frames; and
   selecting a second quantity of the plurality of video frames as the second set of video frames,
      wherein the second quantity is greater than the first quantity.

3. The method of claim 1, wherein a first parameter size of the first CNN model is greater than a second parameter size of the second CNN model.

4. The method of claim 3, wherein a first input resolution of the first CNN model is greater than a second input resolution of the second CNN model.

5. The method of claim 1, wherein each of the saliency maps identifies salient image regions in a video frame of the first set of video frames.

6. The method of claim 1, wherein the one or more saliency gates calculate the saliency maps.

7. The method of claim 1, wherein each of the one or more saliency gates is provided after a convolutional block of the first CNN model.

8. A device, comprising:
   one or more processors configured to:
      receive video data that includes a plurality of video frames;

select a first quantity of the plurality of video frames as a first set of video frames;
select a second quantity of the plurality of video frames as a second set of video frames,
wherein the second quantity is greater than the first quantity;
process the first set of video frames, with a first convolutional neural network (CNN) model that includes one or more saliency gates, to generate first predictions and saliency maps;
generate a trained first CNN model based on the first predictions and the saliency maps;
process the second set of video frames and the saliency maps, with a second CNN model that includes a saliency propagation module, to generate second predictions;
generate a trained second CNN model based on the second predictions,
wherein the trained second CNN model is configured to be utilized more than the trained first CNN model without losing accuracy of predictions; and
perform one or more actions based on the trained first CNN model and the trained second CNN model.

9. The device of claim 8, wherein each of the one or more saliency gates calculates one of the saliency maps based on a hidden representation calculated by a convolutional block of the first CNN model and a last latent representation calculated by the first CNN model.

10. The device of claim 8, wherein the saliency propagation module injects spatial priors of the saliency maps into the second CNN model and corrects spatial misalignment due to elapsed time.

11. The device of claim 8, wherein the one or more processors, to perform the one or more actions, are configured to:
modify the first quantity of the plurality of video frames or the second quantity of the plurality of video frames based on the trained first CNN model and the trained second CNN model.

12. The device of claim 8, wherein the one or more processors, to perform the one or more actions, are configured to:
modify a quantity of the one or more saliency gates based on the trained first CNN model and the trained second CNN model.

13. The device of claim 8, wherein the one or more processors, to perform the one or more actions, are configured to one or more of:
process real time video data with the trained first CNN model and the trained second CNN model to generate classifications for the real time video data; or
process real time temporal-based data with the trained first CNN model and the trained second CNN model.

14. The device of claim 8, wherein the one or more processors, to perform the one or more actions, are configured to:
implement the trained first CNN model and the trained second CNN model at a traffic location or in a vehicle.

15. A non-transitory computer-readable medium storing a set of instructions, the set of instructions comprising:
one or more instructions that, when executed by one or more processors of a device, cause the device to:
receive video data that includes a plurality of video frames;
utilize a scheduling policy to divide the plurality of video frames into a first set of video frames and a second set of video frames;
process the first set of video frames, with a first convolutional neural network (CNN) model that includes one or more saliency gates, to generate first predictions and saliency maps;
generate a trained first CNN model based on the first predictions and the saliency maps;
process the second set of video frames and the saliency maps, with a second CNN model that includes a saliency propagation module, to generate second predictions,
wherein a first parameter size of the first CNN model is greater than a second parameter size of the second CNN model, and
wherein a first input resolution of the first CNN model is greater than a second input resolution of the second CNN model;
generate a trained second CNN model based on the second predictions,
wherein the trained second CNN model is configured to be utilized more than the trained first CNN model without losing accuracy of predictions; and
perform one or more actions based on the trained first CNN model and the trained second CNN model.

16. The non-transitory computer-readable medium of claim 15, wherein the one or more instructions, that cause the device to utilize the scheduling policy to divide the plurality of video frames into the first set of video frames and the second set of video frames, cause the device to:
select a first quantity of the plurality of video frames as the first set of video frames; and
select a second quantity of the plurality of video frames as the second set of video frames, wherein the second quantity is greater than the first quantity.

17. The non-transitory computer-readable medium of claim 15, wherein each of the saliency maps identifies salient image regions in a video frame of the first set of video frames, and
wherein the one or more saliency gates calculate the saliency maps.

18. The non-transitory computer-readable medium of claim 15, wherein each of the one or more saliency gates is provided after a convolutional block of the first CNN model.

19. The non-transitory computer-readable medium of claim 15, wherein each of the one or more saliency gates calculates one of the saliency maps based on a hidden representation calculated by a convolutional block of the first CNN model and a last latent representation calculate by the first CNN model.

20. The non-transitory computer-readable medium of claim 15, wherein the saliency propagation module injects spatial priors of the saliency maps into the second CNN model and corrects spatial misalignment due to elapsed time.

* * * * *